(12) United States Patent
Veltman

(10) Patent No.: US 8,829,812 B2
(45) Date of Patent: Sep. 9, 2014

(54) DIMMABLE LIGHTING SYSTEM

(75) Inventor: André Veltman, Culemborg (NL)

(73) Assignee: Koninklijke Philips N.V., Eindhoven (NL)

( * ) Notice: Subject to any disclaimer, the term of this patent is extended or adjusted under 35 U.S.C. 154(b) by 1276 days.

(21) Appl. No.: 12/575,272

(22) Filed: Oct. 7, 2009

(65) Prior Publication Data

US 2010/0090618 A1   Apr. 15, 2010

Related U.S. Application Data

(63) Continuation-in-part of application No. 12/146,512, filed on Jun. 26, 2008, now Pat. No. 8,212,494.

(60) Provisional application No. 61/042,289, filed on Apr. 4, 2008.

(51) Int. Cl.
  *G05F 1/00*   (2006.01)
  *H05B 37/02*   (2006.01)
  *H05B 39/04*   (2006.01)
  *H05B 41/36*   (2006.01)

(52) U.S. Cl.
  USPC .......................................... 315/307; 315/291

(58) Field of Classification Search
  None
  See application file for complete search history.

(56) References Cited

U.S. PATENT DOCUMENTS

| | | | |
|---|---|---|---|
| 4,935,691 A | 6/1990 | Lamar | |
| 5,194,782 A | 3/1993 | Richardson et al. | |
| 5,872,429 A | 2/1999 | Xia et al. | |
| 6,127,784 A | 10/2000 | Grossman et al. | |
| 7,102,902 B1 | 9/2006 | Brown et al. | |
| 7,656,103 B2 * | 2/2010 | Shteynberg et al. | .......... 315/312 |
| 2002/0017877 A1 | 2/2002 | Oostvogels et al. | |
| 2003/0080696 A1 | 5/2003 | Tang et al. | |
| 2004/0195977 A1 | 10/2004 | Fischer et al. | |
| 2004/0212321 A1 | 10/2004 | Lys et al. | |
| 2005/0168168 A1 | 8/2005 | Elliott | |
| 2007/0182338 A1 | 8/2007 | Shteynberg et al. | |
| 2007/0182347 A1 | 8/2007 | Shteynberg et al. | |
| 2008/0180036 A1 | 7/2008 | Garrity et al. | |

FOREIGN PATENT DOCUMENTS

| | | |
|---|---|---|
| EP | 991304 A2 | 4/2000 |
| GB | 2435724 A | 9/2007 |
| JP | 4006694 A | 1/1992 |

(Continued)

OTHER PUBLICATIONS

Rand D et al: "Issues, Models and Solutions for Triac Modulated Phase Dimming of LED Lamps" Power electronics specialists conference 2007, IEEE, Piscataway NJ, USA, Jun. 17, 2007, pp. 1398-1404.

*Primary Examiner* — Douglas W Owens
*Assistant Examiner* — Dedei K Hammond
(74) *Attorney, Agent, or Firm* — Yuliya Mathis

(57) ABSTRACT

A lighting system for operation with a dimmer circuit comprising a triac connected to a load. The load comprises a driver circuit for supplying current to a light source comprising one or more LEDs, the current being determined at least in part by an adjusted setpoint value. The system further comprises a setpoint filter circuit for obtaining a dimmer setpoint value determined at least in part by a setting of the dimmer circuit, and for generating an adjusted setpoint value. The sensitivity of the adjusted setpoint value to changes in the dimmer setpoint value is low at low values of the dimmer setpoint value.

49 Claims, 11 Drawing Sheets

(56) References Cited

FOREIGN PATENT DOCUMENTS

| | | | |
|---|---|---|---|
| WO | 9929142 | A1 | 6/1999 |
| WO | 2005115058 | A1 | 12/2005 |
| WO | 2006120629 | A2 | 11/2006 |
| WO | 2007026170 | A2 | 3/2007 |
| WO | 2008029108 | A1 | 3/2008 |
| WO | 2008112735 | A2 | 9/2008 |

* cited by examiner

DIMMABLE LIGHTING SYSTEM

This application is a continuation-in-part of U.S. application Ser. No. 12/146,512 filed on Jun. 26, 2008, which claims priority from provisional application No. 61/042,289 filed on Apr. 4, 2008. The contents of both applications are hereby incorporated by reference in their entirety.

BACKGROUND OF THE INVENTION

1. Field of the Invention

The present invention relates to a dimmer triggering circuit for low-load applications, e.g. LED-based light sources. The invention further relates to a dimmer system comprising such a dimmer triggering circuit.

2. Description of the Related Art

Generally, phase-controlled dimmers comprise a triode for alternating current, further referred to as a triac. A triac is a bidirectional switch which can conduct current in either direction when it is triggered, i.e. turned on. It can be triggered by either a positive or a negative voltage being applied to its gate electrode, i.e. when a small current is applied to its gate. This current only needs to be applied for a short period of time, i.e. in the order of microseconds. In other words, the triac needs to be triggered or 'fired'. Once triggered, the device continues to conduct until the current through it drops below a certain threshold value, such as at the end of a half-cycle of alternating current (AC) mains power supply, also referred to as a zero-crossing. As a result, the triac then 'turns off'.

These dimmers work well for dimming incandescent light bulbs which draw comparatively high currents. When these dimmers are used with smaller loads, such as light sources based on light-emitting diodes (LEDs), various problems are encountered. This is a particular problem when replacing standard incandescent light bulbs with LED retrofit light bulbs in situations where a conventional triac dimmer has been installed for use with the light bulb.

An LED light source may not draw enough current to permit the triac in the dimmer to turn on as required, resulting in an inability to dim the light or erratic operation of the dimmer. A small resistive load on the dimmer may cause an oscillation of the voltage at the dimmer output caused by multiple firings of the triac, resulting in incorrect dimming operation. At low dimmer settings the LED driver circuit may toggle on and off, causing a brief flash of light from the LED light source. Furthermore, the human eye perceives light intensity generally according to a logarithmic curve, whereas an LED has an almost linear response, the emitted light intensity being approximately proportional to the current flowing through the LED. When operated with a conventional dimmer, an LED light source will not appear to dim smoothly and the variation in perceived light intensity has no intuitive relation to the dimmer's knob position. Small variations in the supply voltage may also result in visible flickering of the light emitted by the LED light source.

SUMMARY OF THE INVENTION

The invention seeks to address various of these problems according to various embodiments. According to one aspect, the invention relates to a lighting system for operation with a dimmer circuit comprising a triac connected to a load. The load comprises a driver circuit for supplying current to a light source comprising one or more LEDs, the current being determined at least in part by an adjusted setpoint value. The system further comprises a setpoint filter circuit for obtaining a dimmer setpoint value determined at least in part by a setting of the dimmer circuit, and for generating an adjusted setpoint value. The sensitivity of the adjusted setpoint value to changes in the dimmer setpoint value is low at low values of the dimmer setpoint value.

The setpoint filter circuit may be configured to increase the adjusted setpoint at a lower rate at low values of the dimmer setpoint value, and at a higher rate at high values of the dimmer setpoint value. The variation of the adjusted setpoint value in response to changes in the dimmer setpoint value preferably approximates an exponential response. The setpoint filter circuit preferably generates the full range of the adjusted setpoint value over less than the full range of the dimmer setpoint value, and preferably generates an adjusted setpoint value having a minimum value greater than zero.

The setpoint filter circuit may also be configured to generate the adjusted setpoint having a first substantially constant value during a first portion of the range dimmer setpoint value, increasing at a low rate during a second portion of the range dimmer setpoint value, increasing at a high rate during a third portion of the range dimmer setpoint value, and having a second substantially constant value during a fourth portion of the range dimmer setpoint value.

The setpoint filter circuit may also include a second or higher order low pass filter for filtering the received dimmer setpoint value. The setpoint filter circuit may include a differential amplifier generating an intermediate setpoint value, which controls a transistor to generate the adjusted setpoint value.

The driver circuit may be designed with a voltage control circuit and a current control circuit, wherein the voltage control circuit controls the voltage at an output of the driver circuit according to a voltage setpoint, and the current control circuit modifies the voltage setpoint according to a current setpoint. The current control circuit may be designed to operate within a predetermined range, the voltage setpoint being maintained at a boundary value when the current control circuit is at a boundary of its operating range.

The setpoint filter circuit may obtain the dimmer setpoint value from a voltage at an output terminal of the dimmer circuit. The setpoint filter circuit may alternatively derive the dimmer setpoint value from a firing angle of the dimmer triac, and it may be derived from a time delay between a zero crossing of a supply voltage and a first triggering of the triac after the zero crossing point.

The lighting system may also include a dimmer triggering circuit for triggering the dimmer triac, and the dimmer setpoint value may be determined at least in part by a time of occurrence of one or more rising and/or falling edges of a current flowing though a dimmer triggering circuit, or a voltage related to the rising edge and falling edge. Thus, the dimmer setpoint value may be determined at least in part by a time delay between a rising edge and a falling edge of a current flowing though a dimmer triggering circuit, or a voltage related to the rising edge and falling edge. The lighting system of the invention may be designed for operation when the current through the dimmer circuit when the dimmer triac is on is below a holding current of the dimmer triac.

The lighting system may include a dimmer triggering circuit for triggering the dimmer triac, where the dimmer triggering circuit comprises a voltage-level detector for detecting whether an input voltage of the dimmer triggering circuit is below a threshold value, and a bipolar current source circuit for providing a current if the voltage detected by the voltage-level detector is below the threshold value and to be deactivated otherwise. The lighting system may be designed so that the maximum current through the dimmer triggering circuit is below a holding current of the dimmer triac, and the current through the dimmer triggering circuit is below a holding current of the triac when the dimmer triac is on, or when the dimmer triac is off. The dimmer triggering circuit may be designed so that, in operation, it dissipates an average power less than 100 mW.

In another aspect, the invention also relates to a setpoint filter circuit for use in a lighting system comprising a triac dimmer circuit, a light source comprising one or more LEDs, and a driver circuit for supplying current to one or more LEDs in which the current is determined at least in part by an adjusted setpoint value. The setpoint filter circuit comprises an input circuit for obtaining a dimmer setpoint value determined at least in part by a setting of the dimmer circuit, and an adjustment circuit for generating an adjusted setpoint value, wherein the sensitivity of the adjusted setpoint value to changes in the dimmer setpoint value is low at low values of the dimmer setpoint value.

The setpoint filter circuit may be designed to increase the adjusted setpoint at a lower rate at low values of the dimmer setpoint value, and at a higher rate at high values of the dimmer setpoint value, and the variation of the adjusted setpoint value in response to changes in the dimmer setpoint value may approximate an exponential response. The adjustment circuit may be configured to generate the full range of the adjusted setpoint value over less than the full range of the dimmer setpoint value, and may generate an adjusted setpoint value having a minimum value greater than zero. The input circuit may comprise a second or higher order low pass filter for filtering the received dimmer setpoint value. The adjustment circuit may comprise a differential amplifier generating an intermediate setpoint value, which controls a transistor to generate the adjusted setpoint value.

The setpoint filter circuit may derive the dimmer setpoint value from a voltage at an output terminal of the dimmer circuit. The dimmer setpoint value may also be derived from a firing angle of the dimmer triac, and this may be achieved by deriving the dimmer setpoint value from a time delay between a zero crossing of a supply voltage and a first triggering of the triac after the zero crossing point.

In yet another aspect, the invention relates to a lighting system for operation with a dimmer circuit comprising a triac, where the system comprises a light source comprising one or more LEDs and a load comprising a dimmer triggering circuit for triggering the dimmer triac and a driver circuit for supplying a current to the one or more LEDs, wherein the current supplied by the driver circuit is determined at least in part by an dimmer setpoint value, and wherein the dimmer setpoint value is derived at least in part from a firing angle of the dimmer triac.

The driver circuit preferably derives the dimmer setpoint value from a time delay between a zero crossing of a supply voltage and a first triggering of the triac after the zero crossing point. The dimmer setpoint value may be determined at least in part by a time of occurrence of one or more rising and/or falling edges of a current flowing though a dimmer triggering circuit, or a voltage related to the rising edge and falling edge. The dimmer setpoint value may be determined at least in part by a time delay between a rising edge and a falling edge of a current flowing though a dimmer triggering circuit, or a voltage related to the rising edge and falling edge.

The driver circuit may comprise a voltage control circuit and a current control circuit, wherein the voltage control circuit controls the voltage at an output of the driver circuit according to a voltage setpoint, and the current control circuit modifies the voltage setpoint according to a current setpoint. The current control circuit preferably operates within a predetermined range, the voltage setpoint being maintained at a boundary value when the current control circuit is at a boundary of its operating range. The lighting system may be configured so that the current through the dimmer circuit when the dimmer triac is on is below a holding current of the dimmer triac, and the maximum current through the dimmer triggering circuit may be below a holding current of the dimmer triac. The lighting system may be configured wherein the current through the dimmer triggering circuit is below a holding current of the triac when the dimmer triac is on, and when the dimmer triac is off. The lighting system may also comprises a setpoint filter circuit for generating an adjusted setpoint value from the dimmer setpoint value, wherein the sensitivity of the adjusted setpoint value to changes in the dimmer setpoint value is low at low values of the dimmer setpoint value.

A further aspect of the invention relates to a lighting system for operation with a dimmer circuit comprising a triac, the system comprising a light source comprising one or more LEDs and a load comprising a dimmer triggering circuit for triggering the dimmer triac and a driver circuit for supplying a current to the one or more LEDs, the driver circuit comprising a power factor correction circuit, wherein the current supplied by the driver circuit is determined at least in part by an dimmer setpoint value which is derived at least in part from a firing angle of the dimmer triac.

DESCRIPTION OF ILLUSTRATIVE EMBODIMENTS

Figure 1:
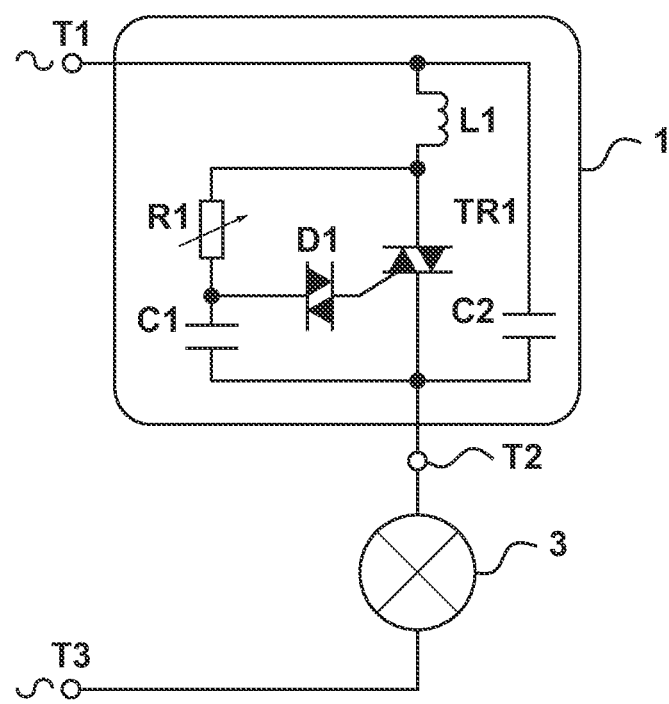
FIG. 1 schematically shows a conventional dimmer connected to an incandescent bulb.

The following is a description of certain embodiments of the invention, given by way of example only. FIG. 1 schematically shows a conventional dimmer 1 connected to a load 3, typically an incandescent light bulb. The dimmer 1 comprises a triac TR1 connected in parallel with a variable resistor R1 and a capacitor C1 in series. In this description, the combination of resistor R1 and capacitor C1 will be referred to as an RC circuit or timer circuit. Additionally, the dimmer comprises a triggering component, i.e. a component suitable to trigger the triac TR1. Generally, a Diode for Alternating Current (diac) is used for this purpose. A diac is a bidirectional trigger-diode that conducts current after a diac threshold voltage, also referred to as the diac trigger voltage, has been exceeded. A diac remains conducting while the current flowing through it remains above a threshold current. If the current decreases below the threshold current, the diac switches back to a high-resistance state. These characteristics make a diac very suitable as a trigger switch for a triac.

The dimmer 1 of FIG. 1 comprises a diac D1, the diac D1 at a first end being connected between the variable resistor R1 and the capacitor C1, and at a second end being connected to the gate of the triac TR1. The dimmer 1 has two terminals, i.e. terminals T1 and T2. The dimmer 1 and its load 3 (the light bulb) is connected in series across an AC voltage source.

As mentioned earlier, the triac TR1 turns off when the current through the triac TR1 falls below its threshold value. Once the zero-crossing of the AC supply voltage has passed, the RC circuit will 'see' the actual AC supply voltage and C1 will charge up. Note that this charging current also flows through the incandescent bulb 3. Once the voltage across C1 reaches the trigger voltage of the diac D1, the diac starts conducting and supplies current to the gate of TR1 while discharging capacitor C1. As a result, the triac TR1 is triggered and turns on, and a current now starts running through the triac TR1 and capacitor C2 is discharged.

By adjusting the resistance of R1, e.g. by means of a dimmer knob or the like operating a potentiometer, the time needed to reach the diac trigger voltage across C1 can be set. A higher value of resistor R1 will result in a longer time needed to reach the diac trigger voltage on C1, and therefore in a shorter conduction interval of the triac TR1. It will be understood that by adjusting the time in which current is flowing through the triac TR1, the power applied to the light bulb 3, and thus its illumination intensity, can be adjusted.

Components may be added to the basic dimmer circuit described above for filtering electromagnetic interference (EMI) generated by the switching of triac TR1. For example, a capacitor C2 may be included across the triac TR1 and inductor L1 in series with Triac TR1. While these additional components are helpful in reducing EMI, the capacitor C2 across the triac will increase the current required to flow through the dimmer 1 (and load 3) to charge capacitor C1 and trigger the triac. This is because this current must charge both capacitors C1 and C2.

Figure 2A:
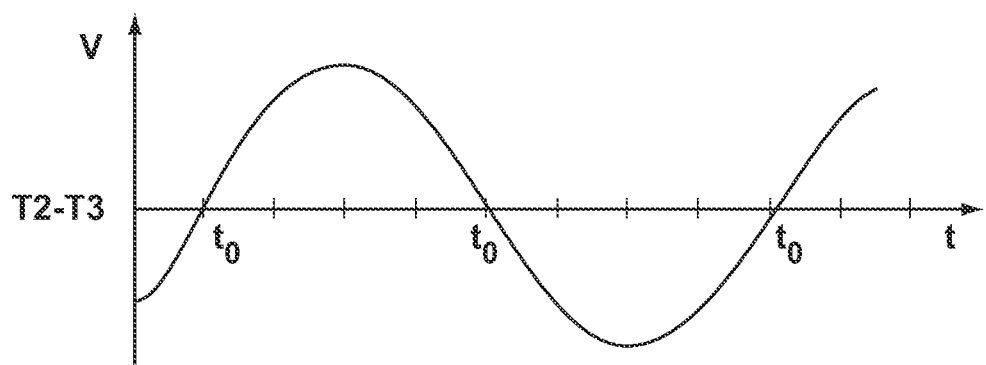
FIG. 2A is a diagram of an example waveform of the AC supply voltage across a dimmer circuit.
Figure 2B:
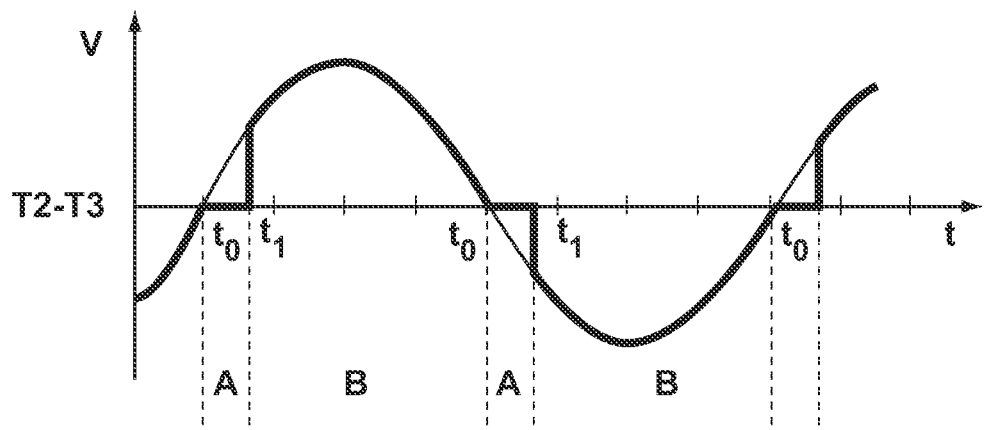
FIGS. 2B and 2C are diagrams of example waveforms of the voltage across the dimmer load at different dimmer settings.
Figure 2C:
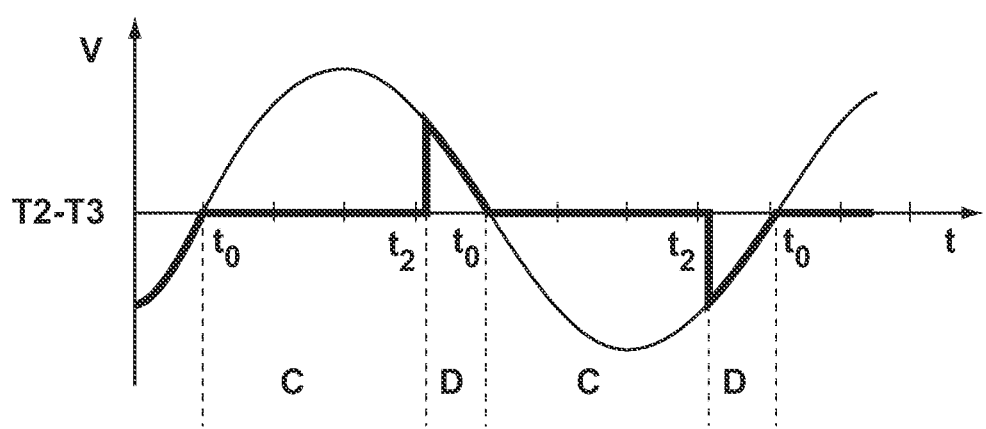

FIG. 2A is a graph showing the waveform of the AC supply voltage across the dimmer 1, across terminals T1-T3, and FIGS. 2B and 2C show the approximate waveform of the resulting voltage across the load 3 (terminals T2-T3) at different dimmer settings of the variable resistor R1, assuming a resistive load 3. The AC supply voltage becomes zero at a zero-crossing point t0 of a half-cycle. At this point the triac ceases conducting and the voltage across the load 3 becomes close to zero. The voltage across load 3 is not exactly zero because some current will continue to flow through the series-connected dimmer 1 and load 3, e.g. current to charge capacitors C1 and C2.

As shown in FIG. 2B, at time t1 the capacitor C1 has become sufficiently charged to trigger diac D1 which in turn triggers triac TR1, and the voltage across load 3 rises to approximately the supply voltage and current through load 3 also greatly increases. The triac remains on until the next zero-crossing point t0 when the load is sufficiently high. Thus, during period A of each half-cycle the triac is off and the capacitor C1 is charging. The rate of charge of C1, and the length of time of period A, are dependent on the dimmer setting, i.e. the resistance of variable resistor R1 as set by the dimmer knob. During period B the triac is on and the load 3 is connected across the supply voltage and normal operating current is flowing through the dimmer and load. As can be seen by the waveform in FIG. 2B, the average voltage during each half-cycle is slightly reduced, resulting in a small reduction of current flowing through the resistive load, which is visible as a slight dimming where the load is a light bulb.

In FIG. 2C, the dimmer setting is changed to increase the resistance of variable resistor R1 to dim the light further. At time t2, the capacitor C1 is sufficiently charged to trigger diac D1 and triac TR1, and the triac remains on until the next zero-crossing point to. Thus, during a longer period C the triac is off, and a shorter period D the triac is on. The waveform in FIG. 2C thus has an average voltage during each half-cycle which is greatly reduced, resulting in a large reduction of current flowing through the load, visible as a large amount of dimming where the load is a light bulb. In can be seen that the dimmer performs phase control by adjusting the delay after a zero-crossing after which the triac is turned on, also referred to as the firing angle of the triac.

Dimmers such as dimmer 1 in FIG. 1 function properly if they are used to dim a load such as an incandescent light bulb which presents a sufficiently high load and so draws sufficient current when the triac is off to properly charge the capacitor C1. That is, after a zero-crossing of the supply voltage, the current flowing through the load needs to be sufficiently high to enable recharging of the capacitor C1 in the RC circuit (and C2). If a sufficiently high current does not flow through load 3, the triac TR1 will not be triggered at all or only when the dimmer knob is set so that the resistance of R1 is sufficiently low. A typical result is that the dimming function of the dimmer 1 does not work, i.e. the light cannot be dimmed.

Loads such as an incandescent light bulb of sufficient power provide a current path for charging the RC circuit, a prerequisite for proper functioning of dimmer 1. However, nowadays, there are low-load and discontinuous applications (e.g. with a built-in rectifier and capacitor) that do not draw a sufficient current to enable proper functioning of the dimmer 1. That is, after a zero-crossing of the supply voltage there is insufficient current through the load for proper charging of the RC circuit.

A well known example of a low-load application is an LED light source comprising an electronic circuit driving one or more light emitting diodes (LEDs) that require DC current. The LED circuit 13 generally comprises, besides one or more LEDs, a rectifier and one or more smoothing capacitors, and thus may also be a discontinuous load. In this description, embodiments of the invention will be described further in combination with an LED circuit. However, it must be understood that embodiments of the invention may also be used in combination with other low-load or discontinuous load applications, i.e. applications unable to provide the necessary charging current for the dimmer's RC timer circuit to enable proper functioning of a dimmer such as dimmer 1 schematically shown in FIG. 1. Loads that have a rectifier front-end with a smoothing capacitor can be considered to be discontinuous load applications.

Figure 3:
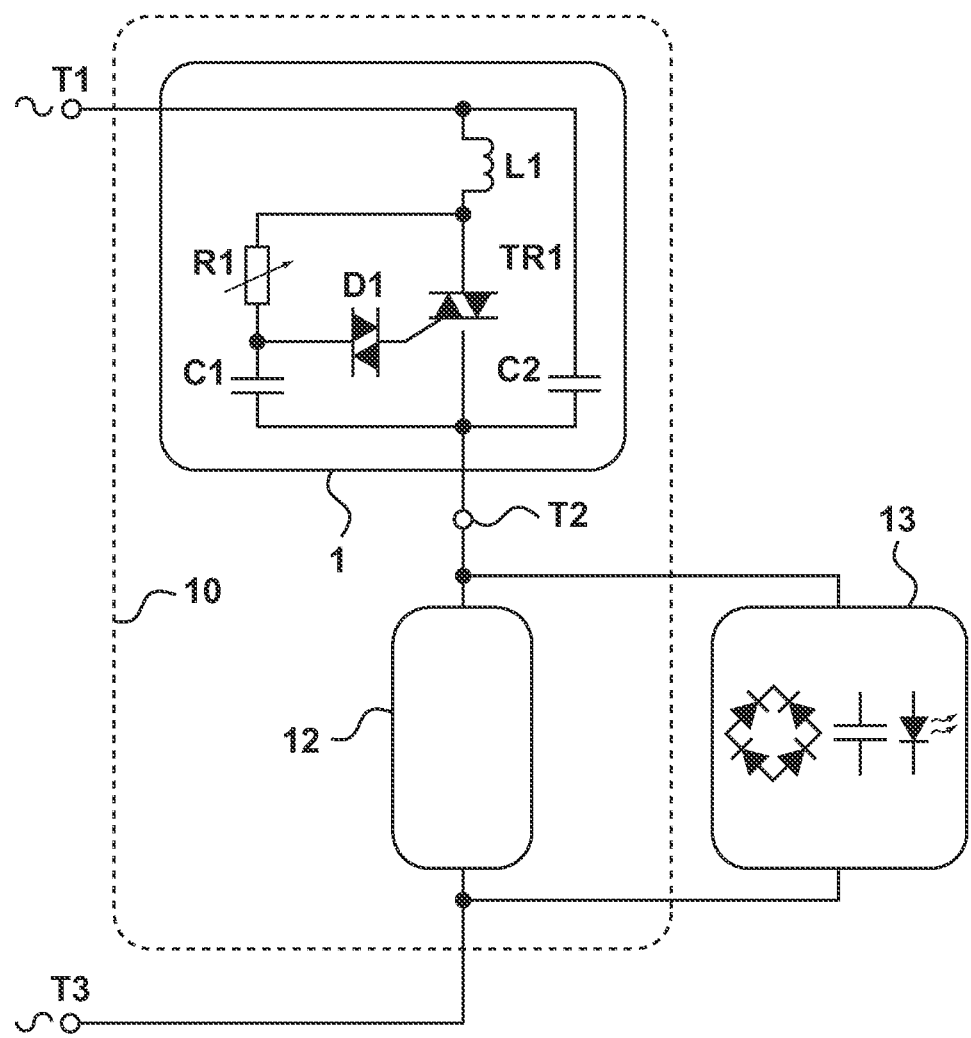
FIG. 3 is a schematic diagram of a lighting system according to an embodiment of the invention including a dimmer triggering circuit connected to an LED light source.

FIG. 3 schematically shows a dimmer system 10 according to an embodiment of the invention connected to an LED circuit 13. The dimmer system comprises a dimmer 1 and dimmer triggering circuit (DTC) 12 connected in series across an AC supply voltage. LED circuit 13 is connected in series with dimmer 1 and in parallel with DTC 12. The combination of DTC 12 and a load such as LED circuit 13 may be referred to as a dimmable device.

Figure 4:
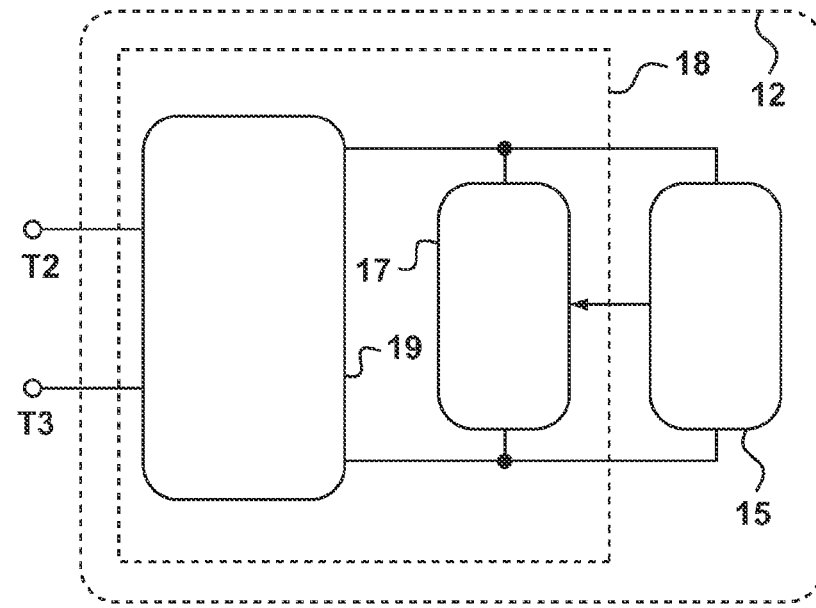
FIG. 4 is a schematic diagram showing additional details of a dimmer triggering circuit for use in a lighting system according to an embodiment of the invention.
Figure 5:
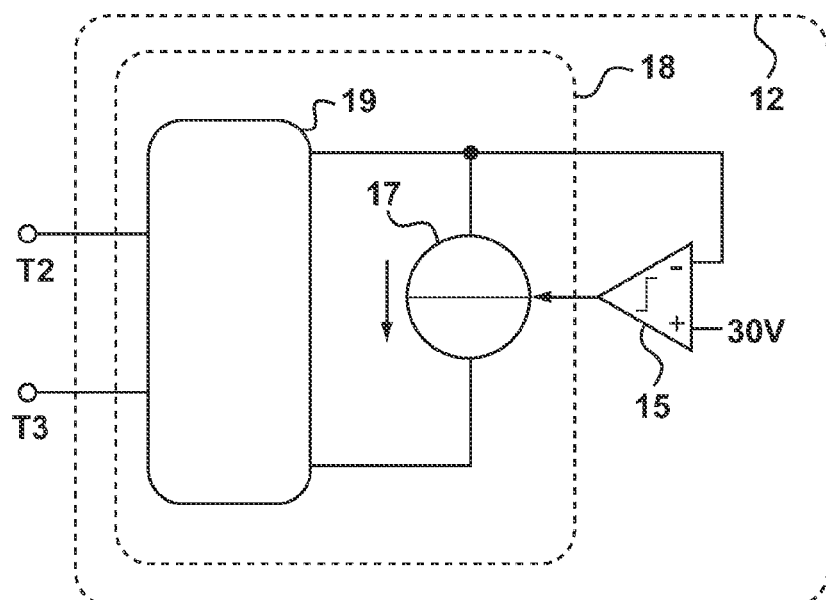
FIG. 5 is a schematic diagram of another embodiment of a dimmer triggering circuit.

FIGS. 4 and 5 schematically show the DTC 12 in more detail. The DTC 12 comprises a voltage-level detector 15, and a bipolar current source circuit 18 which comprises a current source circuit 17 and a rectifier 19. The voltage-level detector 15 is connected to the current source circuit 17, and both the voltage-level detector 15 and the current source circuit 17 are connected to the DC terminals of rectifier 19.

The voltage-level detector 15 is arranged to detect whether the absolute value of the voltage difference between terminals T2 and T3, i.e. the output of rectifier 19, is below a threshold value. The bipolar current source circuit 18 is arranged to be activated if the voltage detected by the voltage level detector 15 remains below the threshold value and to be deactivated otherwise. Therefore, the bipolar current source circuit 18 in the DTC 12 is a voltage-dependent current source, and the DTC 12 as a whole can be considered to act as a bipolar voltage-dependent current source. As will be explained in more detail below, such a DTC 12 can be designed to dissipate an average power less than 100 mW. In well-dimensioned embodiments, the DTC 12 may dissipate an average power of 10-50 mW. Preferably, the dissipation of the DTC 12 is about 30 mW. With such dissipation most conventional dimmers are able to operate as intended.

The voltage-level detector 15 may comprise a microprocessor. The microprocessor is then arranged for detecting whether an absolute value of an input voltage of the dimmer triggering circuit 12 is below a threshold value. If the input voltage of the dimmer triggering circuit 12 is below the threshold value, the microprocessor may provide a signal to instruct the bipolar current source circuit 18 to provide a current. In some embodiments, as will be explained in more detail with reference to FIG. 5B, the microprocessor may instruct the bipolar current source circuit 18 to provide the current after a zero crossing of the input voltage.

The voltage-level detector 15 may comprise a comparator for detecting whether the rectified input voltage is below the threshold value. The comparator comprises two inputs and a single output as schematically shown in FIG. 5. A first input is connected to a reference potential, i.e. a potential equal to the threshold value, in this example 30V. A second input is arranged to receive the input voltage of the dimmer triggering circuit 12. If the input voltage of the dimmer triggering circuit 12 at the second input of the comparator is below the threshold value at the first input of the comparator, the output of the comparator may be such that the bipolar current source circuit 18 provides a current as discussed above. An operational amplifier or voltage comparator may be used to implement the comparator, as will be understood by a person skilled in the art.

The rectifier 19 has an AC-side, i.e. terminals connected to terminals T2 and T3 respectively, and a DC-side, i.e. terminals connected to a reference potential and the other components in the DTC 12 like voltage-level detector 15 and current source circuit 17 in bipolar current source circuit 18. The voltage-level detector 15 and current source circuit 17 form a unipolar circuit. The rectifier 19 is arranged to enable the current generated by the current source circuit 17 to be supplied as a bipolar current to the dimmer.

The DTC 12 allows the dimmer 1 to work as if it was loaded by a normal incandescent lamp. If the AC supply voltage is sufficiently low, i.e. below the aforementioned threshold value, the DTC 12 is activated and enables sufficient current to flow into the RC circuit of the dimmer 1. When the AC supply voltage is sufficiently high, i.e. above the threshold value, the DTC 12 is deactivated and does not draw any significant amount of current, thus reducing wasted power to a minimum. Note that as the voltage-level detector 15 is located at the DC-side of the rectifier 19, only an absolute threshold value is needed. This means that if the threshold value is 30V, the DTC 12 is activated in the range −30V to +30V.

In some embodiments of the DTC 12, when used in connection with a mains power system of 230V at 50 Hz, the threshold value lies between 3V and 50V. In other embodiments of the DTC 12 the minimal threshold value is 10V. In case the DTC 12 is connected to a mains power system of 120V at 60 Hz, as used for example in the United States, the threshold value may lie between 3V and 25V.

The current provided by the DTC 12 keeps the voltage across the load effectively zero until the triac in the dimmer is triggered, e.g. as schematically shown in FIG. 1 with respect to triac TR1 being triggered by diac D1. As soon as the triac switches on, the voltage at terminal T2 increases by a large amount. As a result, the current source circuit 17 in the DTC 12 is deactivated.

Hence, ideally the DTC only conducts current when the voltage at T2 exceeds a threshold value and the DTC behaves like an open circuit otherwise. However, in reality some current will flow through DTC while being deactivated. Preferably, the current provided by the current source circuit 17 in the DTC 12 at deactivation is negligible. A current may be considered to be negligible if the current is at least two orders of magnitude smaller than the maximum current the current source circuit 17 of the DTC 12 can provide. For example, if the maximum current to be provided by the current source circuit 17 in the DTC 12 is 15 mA, a current is considered to be negligible if its value remains below 100 μA.

After a zero crossing, if solely a discontinuous load is present, i.e. a load that draws a discontinuous current such that for a certain part of the voltage cycle the current is zero, the DTC 12 acts complementarily to the state of the triac in the dimmer. That is, if the DTC is on, the triac in the dimmer is off, and vice versa. A bridge rectifier with a capacitor at the output is one example of a discontinuous load.

On the other hand, if besides a discontinuous load also another load is present, after a zero crossing has passed, both the DTC 12 and the triac in the dimmer 1 may be on at the same time, until the DTC 12 shuts off when the input voltage of the DTC 12 exceeds the threshold value described earlier. In such a case, the DTC 12 and the triac in the dimmer 1 do not act completely complementarily. For a fraction of a millisecond, power is dissipated while both the DTC and triac are on. However, this dissipated power will be negligible. For example, for a threshold value of 30V and a current source circuit 17 arranged to provide a current of 20 mA, the peak power typically will not exceed 0.6 W (although this peak power will occur for only a very small interval) and the average power will not exceed 30 mW.

In general, when passing the zero crossing the triac turns off (if it was on) while the DTC 12 remains on. When the triac turns on, the DTC 12 turns off. Hence, the DTC 12 is arranged to supply a current when the absolute voltage at T2 is below a threshold value. This current only needs to be sufficient to enable recharging of the capacitor in the RC circuit of the dimmer and has no relation to the triac's holding or hypostatic current or minimum load of the dimmer in question. The current though the DTC 12 may be below the holding current of the dimmer triac when the DTC is activated (when the triac is off) and when the DTC is deactivated (when the triac is on). This provides the benefit that the DTC 12 can also be used in combination with a triac having a holding current larger than the maximum current to be provided by the DTC 12. Hence, even if the DTC 12 is capable of providing a maximum current of, for example, 20 mA, a dimmer comprising a triac with a holding current larger than 120 mA, e.g. 100 mA, can be used to enable dimming of low load applications.

In order to enable proper functioning of the DTC 12 in a lighting system, e.g. when coupled to an LED circuit 13 as shown in FIG. 2, the capacitance at the AC-side of the rectifier 19 is preferably minimized, as will be understood by a person skilled in the art. Preferably, no additional capacitance is present between terminals T2 and T3.

Thus, the DTC 12 may be used to provide a method for triggering a dimmer in an alternating current circuit. Such a method would comprise detecting whether an absolute value of an input voltage of the DTC is below a threshold value. Subsequently, a current is provided by means of a current source circuit if the voltage detected is below the threshold value, the current flowing though the DTC and dimmer. If the voltage detected is not below the threshold value, only a negligible current flows though the DTC and dimmer. Before detecting the value of the DTC input voltage, the input voltage may be generated by rectifying an alternating voltage of the alternating current circuit. Subsequently or alternatively, the input voltage may be converted into a voltage suitable for detection. Finally, the current provided by the current source circuit may be limited.

Figure 6:
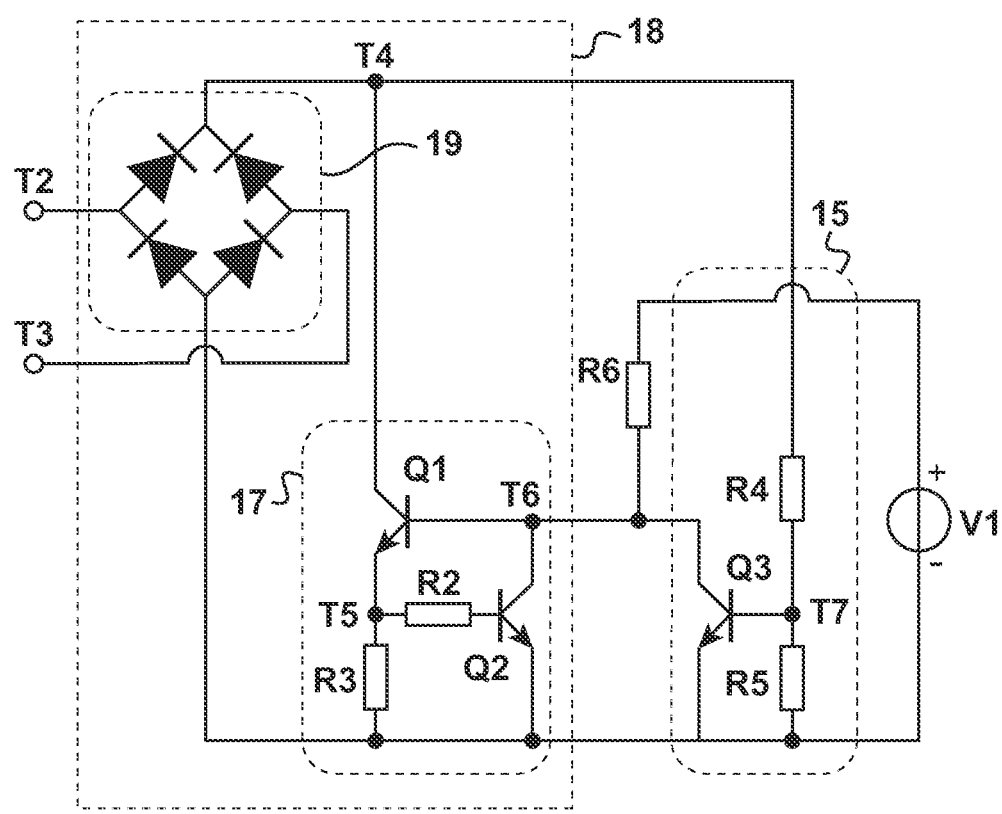
FIG. 6 is a simplified circuit diagram of an embodiment of a dimmer triggering circuit.

FIG. 6 shows a simplified circuit diagram of an embodiment of a DTC such as the DTC 12 shown in FIGS. 3 and 4. It should be understood that this embodiment is an example of one possible implementation of the invention. As a skilled person will know, many implementations are possible. For example, instead of bipolar NPN transistors, other switches like bipolar PNP transistors, Integrated Gate Bipolar Transistors (IGBTs) or Metal Oxide Semiconductor Field Effect Transistors (MOSFETs) may be used. In this embodiment, the bipolar current source circuit 18 again comprises a current source circuit 17 and a rectifier 19. The rectifier 19 comprises a full wave diode bridge rectifier. The current source circuit 17 comprises two resistors R2, R3 and two NPN transistors Q1, Q2. The voltage level detector 15 comprises NPN transistor Q3 and two resistors R4 and R5.

In this embodiment, a DC voltage source V1 is connected to the collector of transistor Q3 of the voltage level detector 15. Resistor R6 is chosen such that a desirable base current may be applied to Q1 when Q3 is off. The DC voltage source V1 may be an external source. It must be understood that, in order to obtain the desired base current, instead of a DC voltage source V1 and a resistor R6, also a current source may be used. Resistors R4 and R5 form a voltage divider designed such that if the voltage at T4 is below the threshold value, the voltage at T7 is such that Q3 is off.

The collector of Q1 in this embodiment of the current source circuit 17 is connected to the terminal of the rectifying diode bridge denoted as T4. The base of Q1 is connected to the collector of Q2, and also to the collector of Q3 in the voltage level detector 15. When the voltage at T4 is below aforementioned threshold value, Q3 is off, and R6 will now provide current to the base of Q1. As a result, the voltage at T6 increases such that Q1 turns on. As a result, Q1 conducts current and voltage at T4 decreases even more, depending on the impedance of the source, which results in an even lower voltage at T7. Consequently, the switch-off time of Q3 is limited. If the current through Q1 exceeds a certain value, the base voltage of Q2 exceeds its switch on voltage, and Q2 starts to conduct, therewith stabilizing the potential at T6, and therefore controlling the collector current passing through Q1. Resistors R2 and R3 are used to design a current source with suitable characteristics, i.e. that transistor Q2 starts conducting if the emitter current through transistor Q1 exceeds a certain value, e.g. a nominal current in the range from 10 to 20 mA. Hence, the combination of transistor Q2 and resistors R2 and R3 provide a feedback circuit which effectively limits the collector current of transistor Q1. R3 sets the current to approximately 0.6/R3, and R2 functions to protect Q2 when the triac fires. The combination of transistors Q1, Q2 and resistors R2, R3 form a stable current source circuit 17 for voltages T4 higher than approximately 1V with respect to the negative terminal of the rectifier 19. When the voltage on T4 goes below approximately 1V the collector current will reduce. A 220Ω resistor may be added in series with the collector of Q1 to limit the current slope at low voltage levels, to meet EMI requirements.

The current source circuit 17 is activated when the voltage-level detector 15 detects that the voltage at T4 becomes lower than a predetermined threshold value and deactivated when the voltage at T4 rises again above a predetermined threshold value.

In order to obtain a DTC 12 designed to supply a current of 15 mA when the voltage at T2 is between −30V and 30V, typical values of the components shown in FIG. 6 are: R2=4.7 kΩ; R3=27Ω; R4=6.6 MΩ (generally constructed by placing two resistors with a value of 3.3 MΩ in series); R5=100 kΩ; R6=47 kΩ; Q1=FMMT458; Q2=BC817; Q3=BC817; V1=10V. The current being provided by the DTC 12 shown in FIG. 6 and provided with components with aforementioned values during activation will be approximately 20 mA, while during deactivation ideally the current will be approximately only 49 µA. Adding leakage current through transistor Q1 may add a few µA.

Figure 7A:
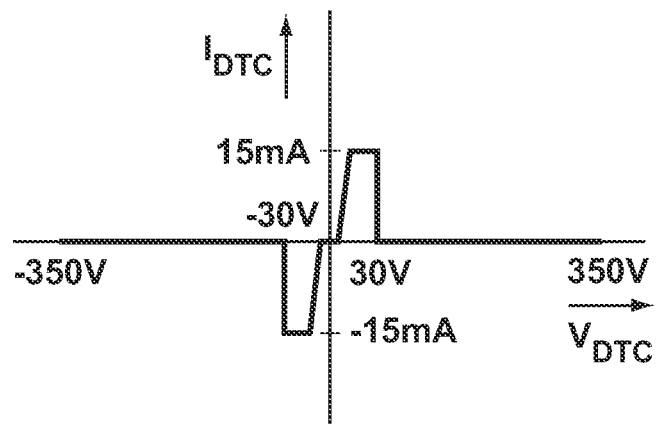
FIG. 7A is a diagram of voltage-current behavior between terminals of the dimmer triggering circuit of FIG. 6.

FIG. 7A schematically shows a graph of the calculation of behavior of current $I_{DTC}$, i.e. the current through a DTC, as a function of voltage $V_{DTC}$, i.e. the voltage across the DTC. In this calculation, the DTC of FIG. 6 is used in which the aforementioned typical values are used for the respective components. Consequently, the DTC is arranged to supply a maximum current with an absolute value of 20 mA if the voltage across the DTC becomes lower than a threshold value of 30V. Due to the rectifier, the current may be supplied to the dimmer in opposite directions.

It may be noted that $I_{DTC}$ equals zero when $V_{DTC}$ is close to zero, and at a certain value of $V_{DTC}$ rises quickly to the design current, in this case an $I_{DTC}$ of no more than 20 mA. The low current near zero $V_{DTC}$ is due to the fact that at low voltage, the current source circuit 17 only supplies current on demand, i.e. the dimmer 1 only needs limited current to charge up its timer circuit (during direct on grid, the current will be higher). The shape of the curve shown in FIG. 7A, which relates to the current source circuit 17 schematically depicted in FIG. 5, is the result of transistor Q1 being in saturation at low voltages.

Figure 7B:
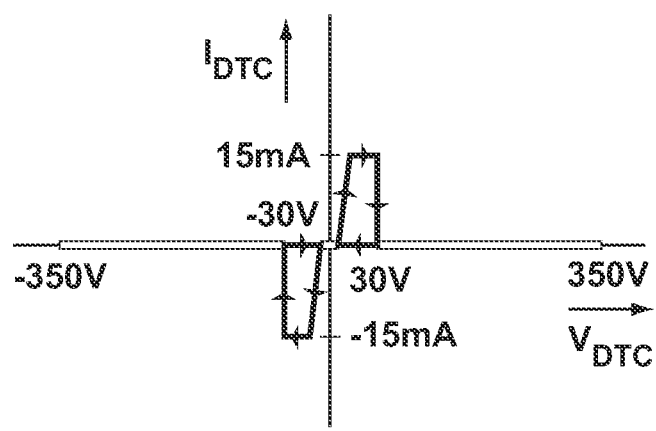
FIG. 7B is a diagram of voltage-current behavior between terminals of an embodiment of a dimmer triggering circuit comprising a microprocessor.

FIG. 7B schematically shows a graph of the voltage-current behavior between terminals of an embodiment of a dimmer triggering circuit of FIG. 4 comprising a microprocessor or direction sensitive component. As shown in FIG. 7B, just before passage of a zero crossing, the DTC 12 may be switched on while the triac in the dimmer 11 may also be on at the same time. As a result, for a short period of time, i.e. the time needed for the voltage across the DTC 12 to go from the threshold value towards zero, power is dissipated. In an embodiment comprising a microprocessor as voltage level detector 15, the microprocessor may be programmed in such a way that it will only allow the bipolar current source circuit 18 to be active after passage of the zero crossing. As a result, the voltage-current behavior between terminals of the DTC 12 becomes as schematically shown in FIG. 7B.

In FIG. 7B, it can be readily seen that the $I_{DTC}$ experiences a kind of hysteresis. That is, the value of $I_{DTC}$ at a certain $V_{DTC}$ depends on former values of $V_{DTC}$. The parts in the graph for which $I_{DTC}$ is independent of past values of $V_{DTC}$ have been schematically illustrated by the gray line. The parts in the graph for which $I_{DTC}$ depends on past values of $V_{DTC}$ has been schematically illustrated by the black line. The arrows denote the direction of change of $V_{DTC}$.

Setpoint Filter Circuit

A lighting system such as depicted in FIG. 3 is typically arranged so that the LED driver circuit in the load 13 comprises a current controller to supply DC current to the LEDs, and the DC current and thus the light intensity of the LEDs is independent of the supply voltage. A current controller controls the LED current within the limits of the system, so that any change in supply voltage will not create any change in LED current. The LED current is controlled according to a setpoint, a different current level resulting from a different setpoint value. In some embodiments of the invention, the average rectified voltage measured with the voltage level detector 15 of the DTC 12 may be used as a setpoint for the driver circuit. A setpoint filter circuit may be used to further optimize dimming of the load. This optimization may result in dimming the load over a different range than the dimmer setting, so that the full range of the adjusted setpoint is generated over less than the full range of the dimmer setting (i.e. the dimmer setpoint value). For example, the circuit may vary the driver circuit setpoint by generating an adjusted setpoint over a range of 0-100% corresponding to a dimmer knob setting of 30-80%.

The optimization may also take the form of more sensitive dimming in low light-intensity regions, i.e. 1-10% within the set light intensity range, and less sensitive dimming in high light intensity regions, e.g. 10-100% within the set light intensity range. Where the lighting system includes an LED light source, the setpoint filter circuit can use this to make the selected light intensity (i.e. selected by the dimmer knob setting) more closely approximate perceived intensity. A typical incandescent lamp uses electrical power to heat a tungsten filament so that it radiates light, typically converting about 10% of the electrical energy consumed into visible light. Incandescent lamps exhibit a progressive response curve, light production from the bulb being roughly proportional to the effective voltage to the third power (cubic response). Note that the RMS voltage has a non-linear relation to effective voltage when phase-controlled voltage waveforms.

The human eye perceives light intensity generally according to a logarithmic curve. Thus, when load current is varied linearly by adjusting the dimmer, the cubic response of an incandescent light matches the logarithmic response of the human eye rather well and dimming of the light is perceived as being relatively linear and smooth. However, an LED exhibits an almost linear response rather than a cubic response, where the emitted light intensity is approximately proportional to the current flowing through the LED. Thus, when load current is varied linearly, the variation in perceived light intensity has no intuitive relation to the dimmer's knob position.

Figure 8:
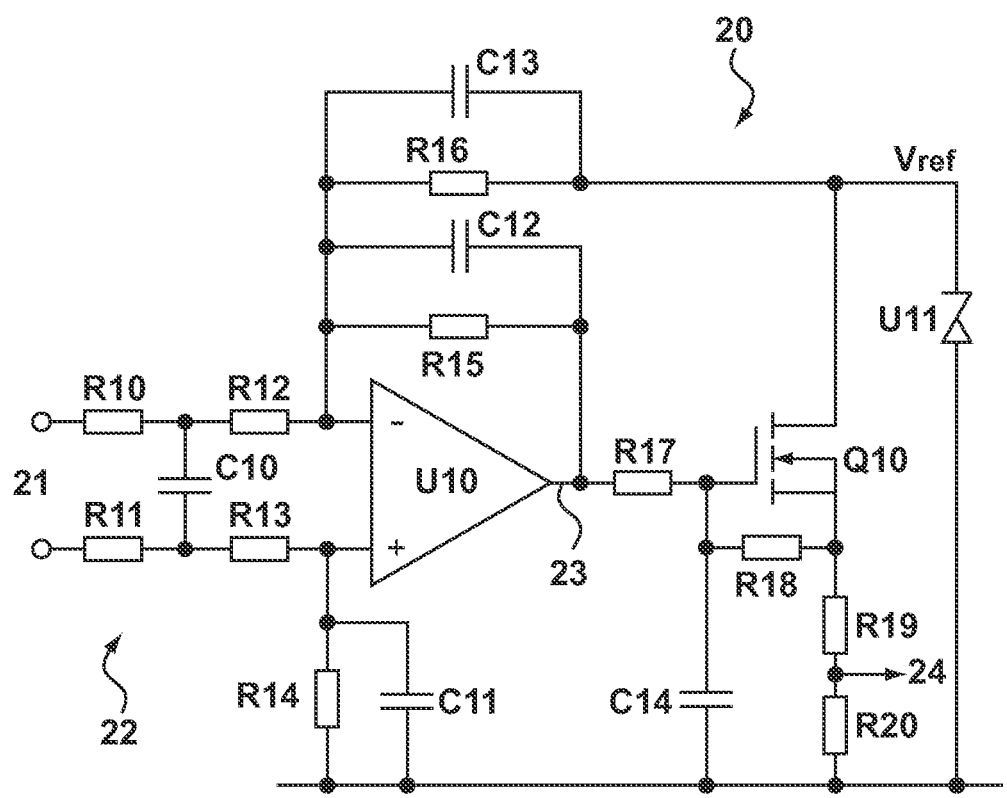
FIG. 8 is a simplified circuit diagram of an embodiment of a setpoint filter circuit.

A setpoint filter circuit can be used to adjust the setpoint used by the driver circuit to generate a setpoint with a progressive response which approximates an exponential variation when the dimmer setting is changed. FIG. 8 shows a circuit diagram of an embodiment of a setpoint filter circuit for generating an approximation of an exponential variation when the setpoint. The circuit includes a low-pass filter (LPF) comprising resistors R10-R13 and capacitor C10. The input 20 to the LPF may be taken, for example, from the output of the rectifier of the DTC 12 shown in FIG. 6, or from another point which conveniently provides the rectified voltage across the load.

This LPF circuit serves a dual purpose, functioning as a barrier between the high voltage input and the low voltage circuits of the LED driver and as a low pass filter to achieve a substantially ripple-free setpoint for the LED current controller and to eliminate flicker of the light source during unsteady dimmer performance due to spurious triac firings which may occur at firing angles between 0 and 90 degrees. A second order LPF is preferably used to measure the rectified supply voltage and determine its average voltage, although a first order filter may also be used, or a third or higher order filter. This filter also provides some time to keep the filtered terminal voltage below the hysteresis threshold during hiccup mode (when the driver circuit starts at (too) low input voltage, switches off again due to lack of supply current, switches on again when the DC capacitor recharges, and so on, repeating until sufficient supply becomes available).

When the dimmer is set to dim the load, the triac should be off until after the relevant phase delay according to the dimmer setting, e.g. during period C in FIG. 2C.

When the triac fires between 90-170 degrees during a half cycle, the triac firings are generally stable and predictable. However, when the triac fires it will charge up the DC-link capacitors (the capacitors on the DC side of the rectifiers of the driver circuit) in a very short time, after which no more current will flow. The triac will then turn off because the current falls below the triac's holding current (usually only a few 100 microseconds after triggering). In the absence of current flow, the voltage across the driver circuit will follow the supply voltage (e.g. the voltage at T2 will follow the voltage at T1).

At triac firing angles between 0-90 degrees, double (or multiple) firing of the triac may occur or some firings may be skipped. Double firing may occur when the dimmer is connected to a resistive load, that is too small to maintain the load current above the holding current of the triac so that the triac turns off again after firing, but large enough to draw enough current through the dimmer circuit to recharge capacitor C1 and cause a retriggering of the triac. Skipped firings may occur because the triac can only switch on when the DC-link voltage is lower than the present value of the supply voltage. If the trigger pulse comes early (close to the zero crossing) the triac will be triggered, but will not fire since the input rectifier does not allow negative current. Suitable values of the components of the LPF in this embodiment are: 10 MΩ) for R10 and R11, 3.9 MΩ) for R12 and R13, and 22 μF for C10. The LPF is designed as a second order filter to filter out spurious switching of the dimmer triac.

The output from the LPF is fed to an integrating operational amplifier U10, and the output 22 from U10 is an intermediate setpoint value which represents the rough dimmer knob setting. This is used to drive the gate of transistor Q10 has a threshold voltage of about 2V and takes care of the progressive function. The source terminal of Q10 is connected to a voltage divider comprising resistors R18, R19 and R20, and the drain terminal is connected to reference voltage Vref derived from a standard integrated voltage reference U11. The resulting signal 24 at the source terminal of Q10 may then be used as the input to the current controller of the LED driver circuit.

As the dimmer setting is changed to dim the load, a lower average voltage across the load results in a lowered reference voltage Vref. When the output of U10 is low, the transistor Q10 is turned off, and the value of the adjusted setpoint signal 24 determined by the output of the U10 and the voltage divider R18/R19/R20. When the output of U10 rises sufficiently to turn transistor Q10 on, the adjusted setpoint signal 24 is determined by the output of the U10 and resistor R19 and R20. In this example, the gate-source threshold voltage of Q10 is utilized to realize a slow-modifying range between 10-40 mA (roughly between 70V and 130V average input) after which a faster section is activated from 40-305 mA (roughly between 130V and 175V), or any other required maximum value. Suitable values for an embodiment of the circuit of FIG. 8 are: R14=278 kΩ); R15=680 kΩ; R16=470 kΩ; R17=39 kΩ); R18=270 kΩ; R19=33 kΩ); R20=1.72 kΩ); C11=100 nF; C12=100 nF; C13=10 nF; and C14=100 nF. For U10 an LM358ADR dual operational amplifier from Texas Instruments may be used, for Q10 an 2N7002 N-channel enhancement mode Field Effect Transistor from Fairchild Semiconductor may be used, and for U11 an adjustable precision shunt regulator from Zetex Semiconductors or Texas Instruments may be used.

The output 24 of the setpoint filter is used as a reference for the LED current controller to approximate smooth dimming for the user. Since the human eye has a logarithmic sense of brightness, a "low-gear" and "high-gear" setpoint shaper is implemented. The setpoint filter circuit produces an adjusted setpoint variation having two slopes, as shown in the example in FIG. 9A. In the example shown in FIG. 9A, the actual dimmer setting SP1 is plotted on the horizontal axis and the adjusted setpoint SP2 which is output by the setpoint filter is plotted on the vertical axis. As can be seen, over the first part of the range of the dimmer setting (0-20% in this example) the adjusted setpoint remains at a very low value 34 until a breakpoint, rises at a low rate 31 over a second part of the range (20-50% in this example), rises at a high rate 32 over a third part of the range (50-80% in this example), and remains at high value 35 (an undimmed value of 100% in this example) over a fourth part of the range (80-100% in this example). The setpoint filter thus generates an adjusted dimmer setpoint having a "two gear" progressive response, which approximates an exponential response. This progressive behaviour of the adjusted setpoint produces a corresponding progressive response in light intensity from the LED light source as the dimmer setting is increased linearly, resulting in a perceived smootherchange in brightness due to the logarithmic response of the human eye.

This progressive response greatly reduces the sensitivity to dimmer firing angle variations (i.e. variations in the triac turn-on delay after a zero crossing) at low light settings. The dimmer firing angle variations occur, for example, as a result of variations in the AC supply voltage. These variations can cause visible flickering of the dimmed light source, particularly at low light dimmer settings. The adjusted setpoint generated by the setpoint filter circuit shown in FIG. 9A has flat portion 34 and a shallow slope 31 at low dimmer settings, reducing the sensitivity of the lighting system to these variations and reducing or eliminating flickering.

Figure 9A:
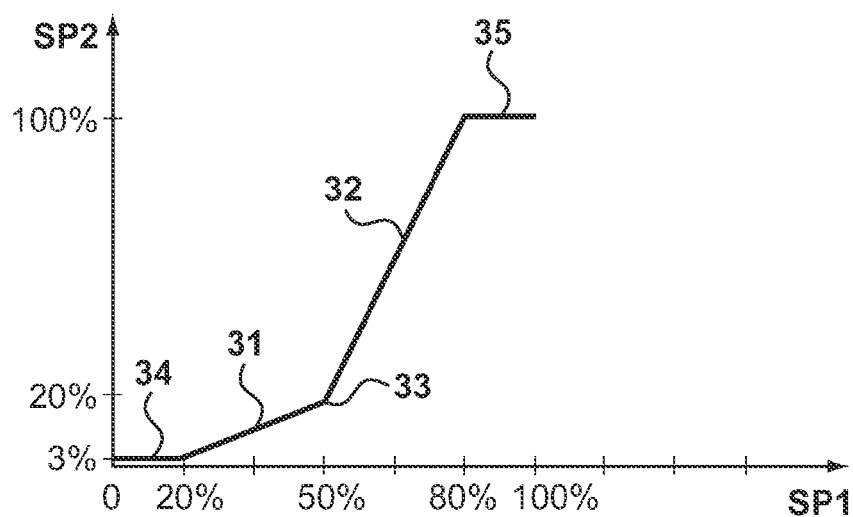
FIG. 9A is a diagram showing an example of variation of adjusted setpoint with two slopes.
Figure 9B:
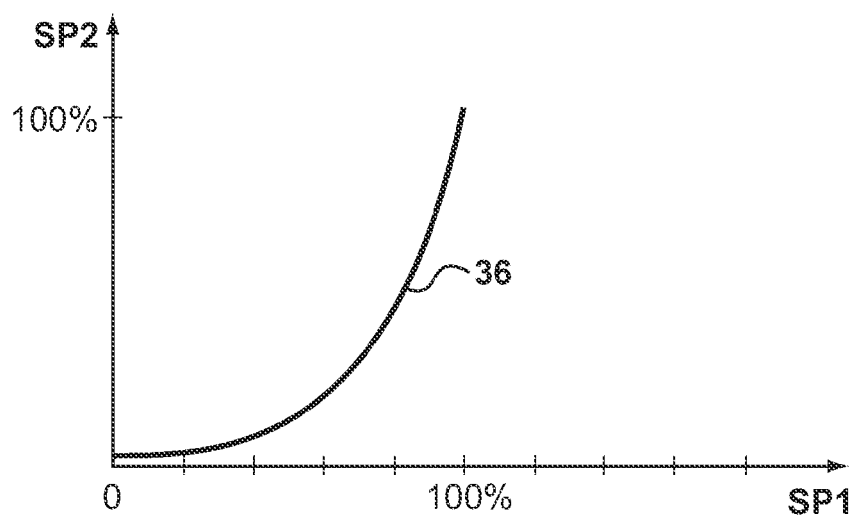
FIG. 9B is a diagram showing an example of variation of adjusted setpoint approximating an exponential response.

The dual-slope adjusted setpoint curve shown in the FIG. 9A is an approximation of an ideal exponential response, as shown in FIG. 9B. An adjusted setpoint curve with three, four or more slopes may be implemented to more closely approximate the exponential curve, using techniques known to those of skill in the art. A microprocessor may also be used to generate an adjusted setpoint following the ideal exponential response.

Figure 10:
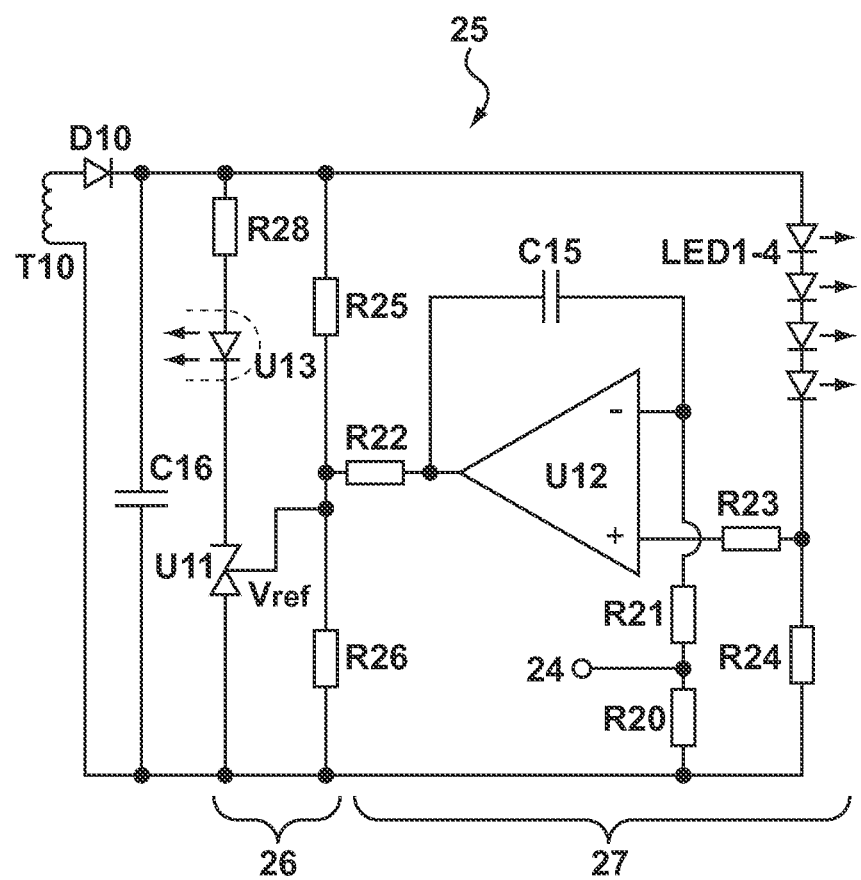
FIG. 10 is a simplified circuit diagram of the secondary side of an embodiment of an LED driver circuit.

The adjusted setpoint generated by the setpoint filter circuit is used as the setpoint input to a current controller to drive the LEDs. FIG. 10 shows a simplified circuit of the secondary side of transformer T10 of an LED driver circuit. As described above, the setpoint filter circuit of FIG. 8 generates an adjusted setpoint voltage 24 across R20 in a piece-wise linear fashion as a function of the output of integrating amplifier U12. The adjusted setpoint 24 is input through resistor R21 to operational amplifier U12, an integrating circuit that is in balance when the voltage across the secondary shunt resistor R24 equals the voltage across R20. Shunt resistor R24 is connected in series with series-connected LEDs 1-4. Amplifier U12 in combination with R20-24 and C15 forms a current controller circuit 27.

The output of U12 provides a feedback signal via resistor R22 and voltage divider R25 and R26 to shunt regulator U11 and optocoupler U13. The optocoupler U13 provides a feedback signal to a fly-back controller on the primary side of T10. This part of the circuit forms a voltage controller circuit 26. The output of U12 can be regarded as a reference value for the voltage controller around U11. If the current through R24 is too low, the voltage feedback from U12 will cause a higher voltage-control setpoint. This will reduce the current through optocoupler U13 to signal the fly-back controller to increase its power flow so that the commanded voltage reference is obtained and the required LED current is realized. If the current through R24 is too high, the feedback signal causes a lower voltage setpoint. The fly-back controller will reduce the power flow to the secondary accordingly to reduce the LED current.

Suitable values for an embodiment of the circuit of FIG. 10 are: R20=1.72 kΩ; R21=4.7 kΩ; R22=8.2 kΩ; R23=2.7 kΩ; R24=39Ω; R25=12 kΩ; R26=2.49 kΩ; R27=2.7 kΩ; C15=1 nF; and C16=3 µF. For U12 an LM358ADR dual operational amplifier from Texas Instruments may be used, and for U13 a PS2801C-1 photocoupler from NEC may be used. For the PWM controller, a UCC28600 from Texas Instruments may be used, configured to operate in constant-output-voltage-controlled mode.

Time Based Setpoint Control

The lighting system described above can be considered as a system where the power signal to drive the LEDs and the information signal to set the intensity of the LEDs are both embodied in the same signal, the average voltage across the load. This arrangement generally relies on the voltage across the load depending on the knob-setting of the dimmer. When this is not the case, particularly due to operation of the dimmer with a low load or discontinuous load, the dimming of the load does not always match the setting of the dimmer.

As discussed above, the lighting system described herein may operate at loads below the holding current of the dimmer triac. The DTC described above will draw sufficient current to ensure triggering of the triac. Once triggered, the DTC will deactivate and draw only a negligible current. The current flowing though the dimmer will drop below the holding current of the dimmer triac when the load is small and in case of a rectifier plus DC-link capacitor load. When the load/driver circuit has an active power factor correction front-end, the load behaves more like a resistor and can potentially cause repetitive recharging and refiring of the dimmer circuit as shown in FIG. 11B.

Figure 11A:
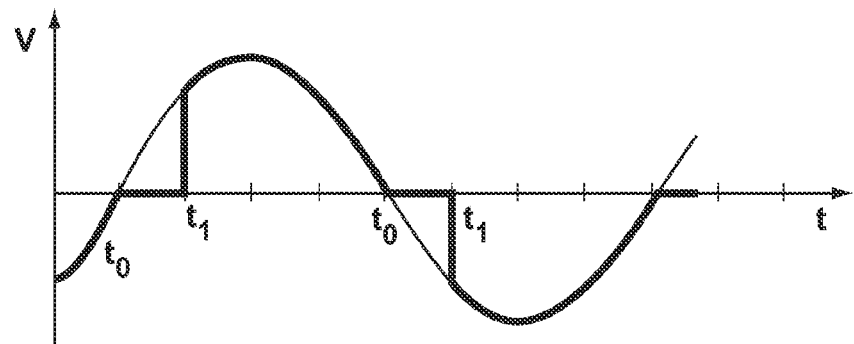
FIG. 11A is a diagram of an example of dimmer output voltage when the dimmer triac current is above the holding current of the triac.

FIG. 11A is a graph showing the waveform of the voltage across the load (e.g. across terminals T2-T3 of the circuit of FIG. 3) when the dimmer setting results in firing the triac at time t1 after a zero-crossing point t0 of each half-cycle, and when the combined current drawn by the load and DTC is zero right after the triac has flash-charged the DC link capacitor(s) through the dimmer triac, as described above.

Figure 11B:
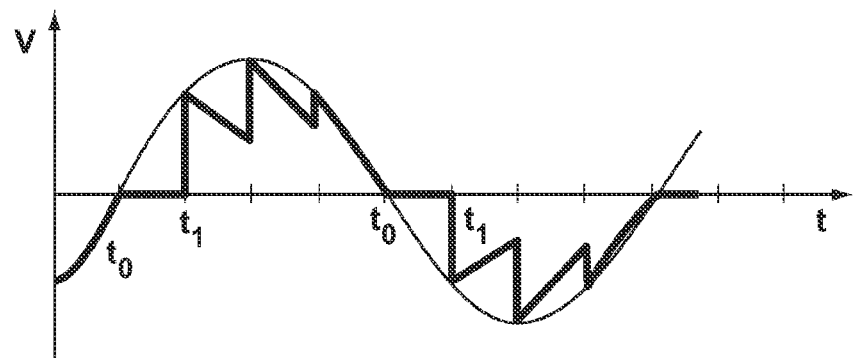
FIG. 11B is a diagram of an example of dimmer output voltage when the dimmer triac current is discontinuous or below the holding current of the triac.

FIG. 11B shows an example of a voltage waveform at the same dimmer setting when the dimmer is connected to a small resistive load, too small to keep the load current above the holding current of the triac. This type of small resistive load may be present in a driver circuit with an active power-factor corrected front-end driving a DC circuit with low power.

At time t1 the triac is triggered and the voltage quickly rises. However, the current flowing through the triac is not sufficient to maintain the triac in a conducting state, and the triac turns off again and the voltage across the load drops due to the resistive characteristic of the load. Because the voltage across the dimmer is increasing, the RC circuit in the dimmer will recharge, even without the DTC ever becoming active and trigger the dimmer triac again. The result is multiple triggering of the triac during each half cycle as shown in FIG. 11B. Such multiple triggering of the triac may result when the triac-based dimmer is connected to a resistive load with low power, such as an active power factor correction circuit boost converter with discontinuous switching for driving a DC link or directly driving LEDs.

This multiple triggering results in a very unsteady voltage across the load and a lower average voltage, as can be seen by comparing the average voltage for each half cycle of FIGS. 11A and 11B. When this voltage is used to derive the setpoint to control the intensity of the LEDs, it will result in an oscillating setpoint. When the average (or RMS) voltage is used to set the intensity of the LED light source in this situation, incorrect dimming with unstable light-output will result.

A solution to this problem is to use time information to control the LED light source intensity, rather than voltage level information. The time delay from a zero-crossing point to the first triggering of the triac following the zero crossing may be used to derive an LED light source intensity control value (this is also referred to as firing angle or phase control value). This time delay value varies depending on the charging time of the RC circuit of the dimmer, which depends on the setting of the dimmer knob, and is not affected by the multiple triac firings which may occur later in the half cycle.

A microprocessor may be used to derive an LED intensity setpoint value from the time delay value. One way to implement this is to measure the time of occurrence of rising edges and falling edges of the current through the DTC, or measure a voltage related to these rising and falling edges. These rising and falling edges of the current are shown for example in FIG. 7B, and correspond to the moments when the triac turns off at a zero crossing and the DTC is activated (rising edge) and when the triac is triggered and the DTC deactivates (falling edge). The time between two rising edges indicates the cycle time between zero crossings of the supply voltage and the time between a rising edge and a falling edge indicates the time delay between a zero crossing and the first triac firing time. From these measurements the triac firing angle can be simply calculated. This can be conveniently done in the embodiments shown in FIGS. 3 and 6 by measuring the rising and falling edges of the voltage at T6, at the base of transistor Q1 of the current source circuit 17 of the DTC 12. In the embodiment described above, this voltage will be about 0.5V when the DTC is activated and Q3 is on, and about 1.5V when the DTC is deactivated and Q3 is off.

The time between the relevant rising/falling edges can be measured using a clock which is started when an edge is detected and stopped when the next relevant edge is detected. The time between a rising edge of DTC current and the next falling edge of DCT current can be determined and divided by the time between two rising edges, to determine an triac off duty-cycle. The triac on duty-cycle is then (1—off duty-cycle). A progressive function can be used to derive the current setpoint for the LEDs, and this function could be exponential with saturation. Such a clock and progressive function can be implemented using a microprocessor or microcontroller as will be understood by one of skill in the art.

This solution also enables the system to be designed for application in dimmable circuits with universal power input, e.g. from 90V to 240V AC supply voltage, for use in countries with differing AC voltages. Because the light source intensity control value is dependent on a time delay value rather than a voltage value, the value of the input voltage and the consequent average load voltage will not change as a function of the AC supply voltage. This enables a single design to be used throughout the world, thereby reducing manufacturing cost due to greater economies of scale.

Hysteresis and Minimum Current

Dimmers without an "off" switch behave like a series capacitor when set in the minimum (i.e. light source off) position. AC current will flow through this "capacitor" and will charge up the DC side of the rectifier in the LED driver circuit. This may be sufficient to start up the controller chip in the LED driver circuit after a short time period. This may cause the LEDs to briefly flash, discharging the DC link An under-voltage will then be detected, the controller will switch off, and the cycle will start over again. In order to prevent this unwanted flashing, the current control circuit may be provided with some positive feedback to create hysteresis. In this way the current controller will receive a zero setpoint until the average input voltage has exceeded a certain limit. After that the current setpoint is switched to a low value (e.g. about 30 mA). By turning back the dimmer knob to a lower setting, the LED current may then be reduced (e.g. to about 10 mA). Thus, at this low dimmer setting the LED may be on or off, depending on the previous dimmer setting.

A minimum current through the LEDs is also preferred, to avoid variations in lighting intensity due to dimmer circuit interaction at close to no-load (i.e. low dimmer settings). At close to no-load, the voltage on the DC side of the rectifier in the LED driver circuit tends to increase due to the LC filter inside the dimmer (e.g. inductor L1 and capacitor C2 included in the dimmer circuit of FIG. 1). This increase raises the measured average load voltage which causes the LED current to rise. This rise in current will lower the DC voltage and the LED current will decrease again. The result is oscillation of the LED current. This problem can be avoided by maintaining the LED current at or above a minimum value, typically at least 5 mA. When the firing angle of the dimmer triac approaches 180 degrees, the circuit will stop working and hiccup mode will result. However due to the hysteresis no light will be produced, which is similar as what an incandescent light bulb would do.

Figure 12:
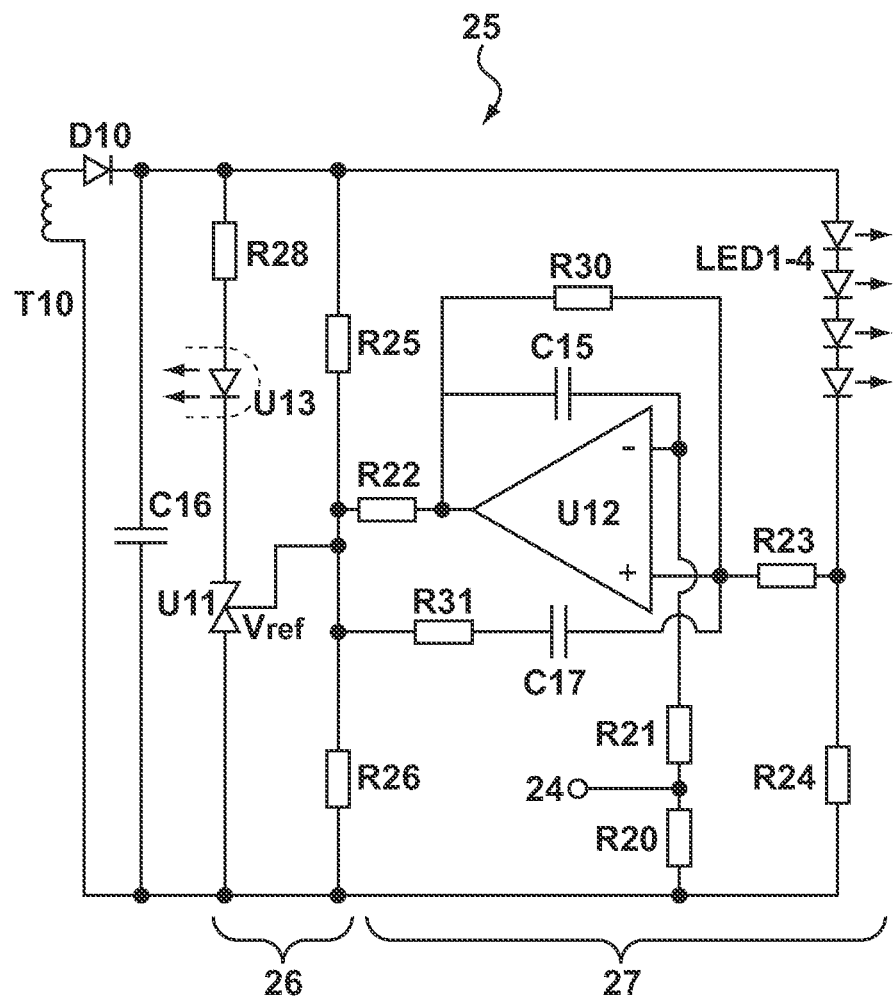
FIG. 12 is a circuit diagram of the secondary side of another embodiment of an LED driver circuit.

The hysteresis and minimum current may be implemented in the embodiment shown in FIG. 10 by adding resistors R30 and R31 and capacitor C17, as shown in FIG. 12. R30 and R23 create a positive feedback around amplifier U12. When the LEDs are controlled, the output of U12 is around 2.5V, and when the LEDs are off, the output of U12 is around 8V. Thus, about 10 mV of hysteresis will appear at node 24. The minimum current is determined by this hysteresis and a resistor across Q10 (not shown) that lifts the reference 24 up from ground. When the LEDs are off and the reference 24 is rising, U12 will toggle as soon as the −input of U12 rises above the +input. After toggling, the +input will drop about 10 mV, thus increasing the setpoint by about 10 mV/R24=30 mA. Suitable values are R30=1.2 MΩ; R31=4.7 kΩ; and C17=10 nF.

Over and Under Voltage Protection

The secondary circuit of the LED driver is preferably designed to act as a current source only between certain limits, for example between 8.3V and 17.3V output voltage, and to use voltage control outside this range. When the current setpoint for the LED is zero, the driver circuit should still be functional. To permit this, the driver circuit output is then voltage controlled to avoid under-voltage-lockout of the flyback controller chip. For voltages above the current control limit, the driver circuit also goes into voltage control mode to avoid overvoltage in the circuit (particularly the power transistor on the primary side of the driver circuit) in case of disconnection or open-circuit failure of the LEDs. The current control limits can be set by resistor values and make use of the voltage reference chip to achieve very low tolerance. The built-in overvoltage protection present in certain flyback controller chips is preferably not used due to its too high tolerances.

Thus, the invention has been described by reference to certain embodiments discussed above. The elements and components in one embodiment may be used with other embodiments. Although the embodiments described above include a DTC, this could be omitted. Furthermore, it will be apparent that various functions of the driver circuit or setpoint filter circuit described above in the context of various embodiments may be omitted from those embodiments or included in other embodiments.

It will be recognized that the embodiments described are susceptible to various modifications and alternative forms well known to those of skill in the art. For example, instead of using a DTC with a full wave rectifier like a diode rectifier bridge, two DTCs with a half wave rectifier may be used. In the latter case, one DTC will be used for one direction of the AC current, and the other DTC will be used in the opposite direction. The circuits described may be designed with bipolar transistors or MOSFETS or other types of switching elements. Note that the terms "base", "collector" and "emitter", and "gate", "drain" and "source" should be broadly interpreted as not only referring to connections to a bipolar transistor or FET but to similar connections to other types of transistors. Furthermore, embodiments of the invention have been described with respect to a lighting system. However, the invention may also relate to a circuit for other types of applications.

What is claimed is:

1. A lighting system for operation with a dimmer circuit comprising a triac connected to a load, the load comprising a driver circuit for supplying current to a light source comprising one or more LEDs, the current being determined at least in part by an adjusted setpoint value, the system further comprising a setpoint filter circuit for obtaining a dimmer setpoint value determined at least in part by a setting of the dimmer circuit, and for generating an adjusted setpoint value, wherein the sensitivity of the adjusted setpoint value to changes in the dimmer setpoint value is low at low values of the dimmer setpoint value.

2. The lighting system of claim 1, wherein the setpoint filter circuit is configured to increase the adjusted setpoint at a lower rate at low values of the dimmer setpoint value, and at a higher rate at high values of the dimmer setpoint value.

3. The lighting system of claim 2, wherein variation of the adjusted setpoint value in response to changes in the dimmer setpoint value approximates an exponential response.

4. The lighting system of claim 1, wherein the setpoint filter circuit generates the full range of the adjusted setpoint value over less than the full range of the dimmer setpoint value.

5. The lighting system of claim 1, wherein the setpoint filter circuit generates an adjusted setpoint value having a minimum value greater than zero.

6. The lighting system of claim 1, wherein the setpoint filter circuit is configured to generate the adjusted setpoint having a first substantially constant value during a first portion of the range dimmer setpoint value, increasing at a low rate during a second portion of the range dimmer setpoint value, increasing at a high rate during a third portion of the range dimmer setpoint value, and having a second substantially constant value during a fourth portion of the range dimmer setpoint value.

7. The lighting system of claim 1, wherein the setpoint filter circuit includes a second or higher order low pass filter for filtering the received dimmer setpoint value.

8. The lighting system of claim 1, wherein the setpoint filter circuit comprises a differential amplifier generating an intermediate setpoint value, which controls a transistor to generate the adjusted setpoint value.

9. The lighting system of claim 1, wherein the driver circuit comprises a voltage control circuit and a current control circuit, wherein the voltage control circuit controls the voltage at an output of the driver circuit according to a voltage setpoint, and the current control circuit modifies the voltage setpoint according to a current setpoint.

10. The lighting system of claim 9, wherein the current control circuit operates within a predetermined range, the voltage setpoint being maintained at a boundary value when the current control circuit is at a boundary of its operating range.

11. The lighting system of claim 1, wherein the setpoint filter circuit obtains the dimmer setpoint value from a voltage at an output terminal of the dimmer circuit.

12. The lighting system of claim 1, wherein the setpoint filter circuit derives the dimmer setpoint value from a firing angle of the dimmer triac.

13. The lighting system of claim 12, wherein the setpoint filter circuit derives the dimmer setpoint value from a time delay between a zero crossing of a supply voltage and a first triggering of the triac after the zero crossing point.

14. The lighting system of claim 12, further comprising a dimmer triggering circuit for triggering the dimmer triac, and wherein the dimmer setpoint value is determined at least in part by a time of occurrence of one or more rising and/or falling edges of a current flowing through a dimmer triggering circuit, or a voltage related to the rising edge and falling edge.

15. The lighting system of claim 14, wherein the dimmer setpoint value is determined at least in part by a time delay between a rising edge and a falling edge of a current flowing through a dimmer triggering circuit, or a voltage related to the rising edge and falling edge.

16. The lighting system of claim 1, wherein the current through the dimmer circuit when the dimmer triac is on is below a holding current of the dimmer triac.

17. The lighting system of claim 1, further comprising a dimmer triggering circuit for triggering the dimmer triac, the dimmer triggering circuit comprising a voltage-level detector for detecting whether an input voltage of the dimmer triggering circuit is below a threshold value, and a bipolar current source circuit for providing a current if the voltage detected by the voltage-level detector is below the threshold value and to be deactivated otherwise.

18. The lighting system of claim 17, wherein the maximum current through the dimmer triggering circuit is below a holding current of the dimmer triac.

19. The lighting system of claim 17, wherein the current through the dimmer triggering circuit is below a holding current of the triac when the dimmer triac is on.

20. The lighting system of claim 17, wherein the current through the dimmer triggering circuit is below a holding current of the triac when the dimmer triac is off.

21. The lighting system of claim 17, wherein the dimmer triggering circuit, in operation, dissipates an average power less than 100 mW.

22. A setpoint filter circuit for use in a lighting system comprising a triac dimmer circuit, a light source comprising one or more LEDs, and a driver circuit for supplying current to one or more LEDs, the current being determined at least in part by an adjusted setpoint value, the setpoint lifter circuit comprising:
  an input circuit for obtaining a dimmer setpoint value determined at least in part by a setting of the dimmer circuit; and
  an adjustment circuit for generating an adjusted setpoint value, wherein the sensitivity of the adjusted setpoint value to changes in the dimmer setpoint value is low at low values of the dimmer setpoint value.

23. The setpoint filter circuit of claim Z2, wherein the adjusted setpoint increases at a lower rate at low values of the dimmer setpoint value, and at a higher rate at high values of the dimmer setpoint value.

24. The setpoint filter circuit of claim 22, wherein variation of the adjusted setpoint value in response to changes in the dimmer setpoint value approximates an exponential response.

25. The setpoint filter circuit of claim 2, wherein the adjustment circuit generates the full range of the adjusted setpoint value over less than the full range of the dimmer setpoint value.

26. The setpoint filter circuit of claim 22, wherein the adjustment circuit generates an adjusted setpoint value having a minimum value greater than zero.

27. The setpoint filter circuit of claim 22, wherein the input circuit comprises a second or higher order low pass filter for filtering the received dimmer setpoint value.

28. The setpoint filter circuit of claim 22, wherein the adjustment circuit comprises a differential amplifier generating an intermediate setpoint value, which controls a transistor to generate the adjusted setpoint value.

29. The setpoint filter circuit of claim 22, wherein the dimmer setpoint value is derived from a voltage at an output terminal of the dimmer circuit.

30. The setpoint filter circuit of claim 22, wherein the dimmer setpoint value is derived from a firing angle of the dimmer triac.

31. The setpoint filter circuit of claim 30, wherein the dimmer setpoint value is derived from a time delay between a zero crossing of a supply voltage and a first triggering of the triac after the zero crossing point.

32. A lighting system for operation with a dimmer circuit comprising a triac, the system comprising
  a light source comprising one or more LEDs, and
  a load comprising a dimmer triggering circuit for triggering the dimmer triac and a driver circuit for supplying a current to the one or more LEDs, wherein the current supplied by the driver circuit is determined at least in part by a dimmer setpoint value, and wherein the dimmer setpoint value is derived at least in part from a firing angle of the dimmer triac, and
  a setpoint filter circuit for generating an adjusted setpoint value from the dimmer setpoint value, wherein sensitivity of the adjusted setpoint value to changes in the dimmer setpoint value is low at values of the dimmer setpoint value.

33. The lighting system of claim 32, wherein the driver circuit derives the dimmer setpoint value from a time delay between a zero crossing of a supply voltage and a first triggering of the triac after the zero crossing point.

34. The lighting system of claim 32, wherein the dimmer setpoint value is determined at least in part by a time of occurrence of one or more rising and/or falling edges of a current flowing through a dimmer triggering circuit, or a voltage related to the rising edge and falling edge.

35. The lighting system of claim 34, wherein the dimmer setpoint value is determined at least in part by a time delay between a rising edge and a falling edge of a current flowing through a dimmer triggering circuit, or a voltage related to the rising edge and falling edge.

36. The lighting system of claim 32, wherein the driver circuit comprises a voltage control circuit and a current control circuit, wherein the voltage control circuit controls the voltage at an output of the driver circuit according to a voltage setpoint, and the current control circuit modifies the voltage setpoint according to a current setpoint.

37. The lighting system of claim 36, wherein the current control circuit operates within a predetermined range, the voltage setpoint being maintained at a boundary value when the current control circuit is at a boundary of its operating range.

38. The lighting system of claim 32, wherein the current through the dimmer circuit when the dimmer triac is on is below a holding current of the dimmer triac.

39. The lighting system of claim 32, wherein the dimmer triggering circuit comprises a voltage-level detector for detecting whether an input voltage of the dimmer triggering circuit is below a threshold value, and a bipolar current source circuit for providing a current if the voltage detected by the voltage-level detector is below the threshold value and to be deactivated otherwise.

40. The lighting system of claim 32, wherein the maximum current through the dimmer triggering circuit is below a holding current of the dimmer triac.

41. The lighting system of claim 32, wherein the current through the dimmer triggering circuit is below a holding current of the triac when the dimmer triac is on.

42. The lighting system of claim 32, wherein the current through the dimmer triggering circuit is below a holding current of the triac when the dimmer triac is off.

43. The lighting system of claim 32, wherein the dimmer triggering circuit, in operation, dissipates an average power less than 100 mW.

44. The lighting system of claim 32, wherein the setpoint lifter circuit is configured to increase the adjusted setpoint at a lower rate at low values of the dimmer setpoint value, and at a higher rate at high values of the dimmer setpoint value.

45. The lighting system of claim 32, wherein variation of the adjusted setpoint value in response to changes in the dimmer setpoint value approximates an exponential response.

46. The lighting system of claim 32, wherein the setpoint filter circuit generates the full range of the adjusted setpoint value over less than the full range of the dimmer setpoint value.

47. The lighting system of claim 32, wherein the setpoint filter circuit generates an adjusted setpoint value having a minimum value greater than zero.

48. The lighting system of claim 32, wherein the setpoint filter circuit is configured to generate the adjusted setpoint having a first substantially constant value during a first portion of the range dimmer setpoint value, increasing at a low rate during a second portion of the range dimmer setpoint value, increasing at a high rate during a third portion of the range dimmer setpoint value, and having a second substantially constant value during a fourth portion of the range dimmer setpoint value.

49. A lighting system for operation with a dimmer circuit comprising a triac, the system comprising a light source comprising one or more LEDs and a load comprising a dimmer triggering circuit for triggering the dimmer triac and a driver circuit for supplying a current to the one or more LEDs, the driver circuit comprising a power factor correction circuit, wherein the current supplied by the driver circuit is determined at least in part by an dimmer setpoint value which is derived at least in part from a firing angle of the dimmer triac, and a setpoint filter circuit for generating an adjusted setpoint value from the dimmer setpoint value, wherein sensitivity of the adjusted setpoint value to changes in the dimmer setpoint value is low at low values of the dimmer setpoint value.

* * * * *